United States Patent [19]

Levine

[11] Patent Number: 5,542,045
[45] Date of Patent: Jul. 30, 1996

[54] METHOD FOR INTERPOSING A SECURITY FUNCTION IN A COMPUTER PROGRAM

[75] Inventor: Anatoli Levine, Stamford, Conn.

[73] Assignee: Software Security, Inc., Darien, Conn.

[21] Appl. No.: 400,285

[22] Filed: Mar. 3, 1995

Related U.S. Application Data

[63] Continuation of Ser. No. 137,838, Oct. 15, 1993, abandoned.

[51] Int. Cl.⁶ .................................. H04L 9/00; G06F 7/00
[52] U.S. Cl. ........................ 395/186; 395/700; 395/600
[58] Field of Search ...................................... 395/575, 325, 395/400, 600, 650, 186, 187.01, 188.01, 700, 600; 380/3, 4

[56] References Cited

U.S. PATENT DOCUMENTS

| | | | |
|---|---|---|---|
| 3,609,697 | 9/1971 | Blevins et al. | 340/172.5 |
| 4,499,556 | 2/1985 | Halpern | 395/575 |
| 4,519,036 | 5/1985 | Green | 364/200 |
| 4,634,807 | 1/1987 | Chorley et al. | 178/22.08 |
| 4,864,494 | 9/1989 | Kobus, Jr. | 395/575 |
| 4,866,769 | 9/1989 | Karp | 380/4 |
| 4,972,453 | 11/1990 | Daniel, III et al. | 379/10 |
| 5,023,773 | 6/1991 | Baum et al. | 395/400 |
| 5,222,133 | 6/1993 | Chou et al. | 380/4 |
| 5,483,649 | 1/1996 | Kuznetson et al. | 395/186 |

OTHER PUBLICATIONS

Unix System V/386 Release 3.2, Programmer's Guide, vol. II, "Source Code Control System (SCCS)", Prentice Hall, New Jersey, 1989, vol. 2, pp. 14-1-14.40.

*Primary Examiner*—Robert W. Beausoliel, Jr.
*Assistant Examiner*—Ly V. Hua
*Attorney, Agent, or Firm*—Pollock, Vande Sande & Priddy

[57] ABSTRACT

A developer writing a software program provides security for the program being prepared by interposing a special security layer in front of the standard library being utilized for writing the program. A security header and security file are incorporated in the software which automatically reroutes standard library calls through the special security layer prior to putting the calls through to the standard library files.

7 Claims, 1 Drawing Sheet

METHOD FOR INTERPOSING A SECURITY FUNCTION IN A COMPUTER PROGRAM

This application is a continuation of U.S. patent application Ser. No. 08/137,838 filed Oct. 15, 1993 now abandoned.

BACKGROUND OF THE INVENTION

This invention relates to a method for providing security for a developer's software, and more particularly to such a method which requires no special knowledge or experience with respect to security systems on the part of the developer and requires no source code modifications.

One of the problems facing a developer in writing a software program on which security is desired to be provided is the lack of experience of the developer in security systems. If the developer has no special knowledge or experience or if such knowledge is limited with respect to security systems, then the security which is incorporated in the program will be inadequate or weak. In addition, the provision of security has in the past required source code modification. Such knowledge and/or modifications require considerable time and effort which might better be spent by the developer in writing the program to solve the problems to which the program is directed.

SUMMARY OF THE INVENTION

Accordingly, it is an object of this invention to provide a new and improved method of protecting a developer's software requiring no special security systems knowledge by the developer.

Another object of this invention is to provide a new and improved method of protecting a developer's software requiring no modification of the original developer's source code.

In carrying out this invention in one illustrative embodiment thereof, a method of protecting a developer's software is provided by interposing a special security layer between the standard library files being utilized for writing the software program, automatically rerouting standard library calls through the special security layer prior to putting the calls to the library files and incorporating a security header and a file in said software to implement security for said software utilizing said special security layer.

BRIEF DESCRIPTION OF THE DRAWINGS

The invention, together with further advantages, objects, aspects and features thereof, will be more clearly understood from the following description taken in connection with the accompanying drawings.

DESCRIPTION OF THE PREFERRED EMBODIMENTS

Figure 1:
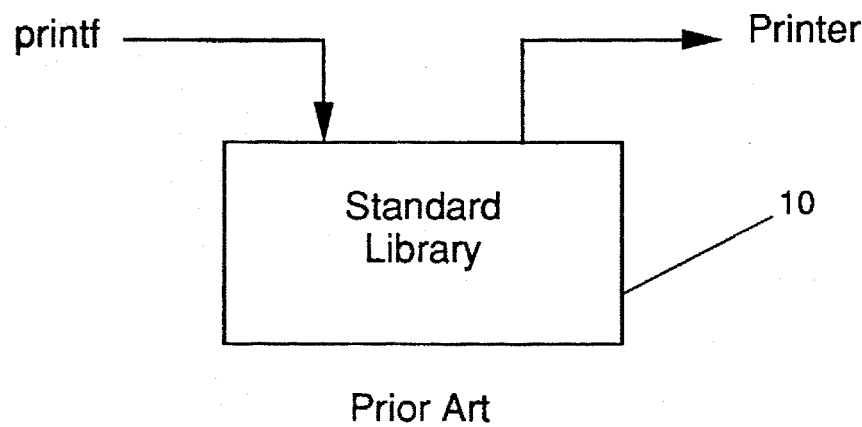
FIG. 1 is a block diagram illustrating the use of standard libraries by a software developer.

Referring now to FIG. 1, when a developer is preparing a program, reference is made to the library facilities 10 and in particular library routines as, for example, Microsoft's, Borland's, Watcom's, etc. Programs are thus developed using and adapting a variety of existing sub-routines. No security or protection for the program being written is provided. To provide protection, the developer must originate some type of security system, then change the source code to incorporate the originated security system. This procedure not only requires special knowledge of security systems but also requires changes in the source code which are costly in time consumption and might better be spent in developing the program directed to the problems to be solved thereby.

Figure 2:
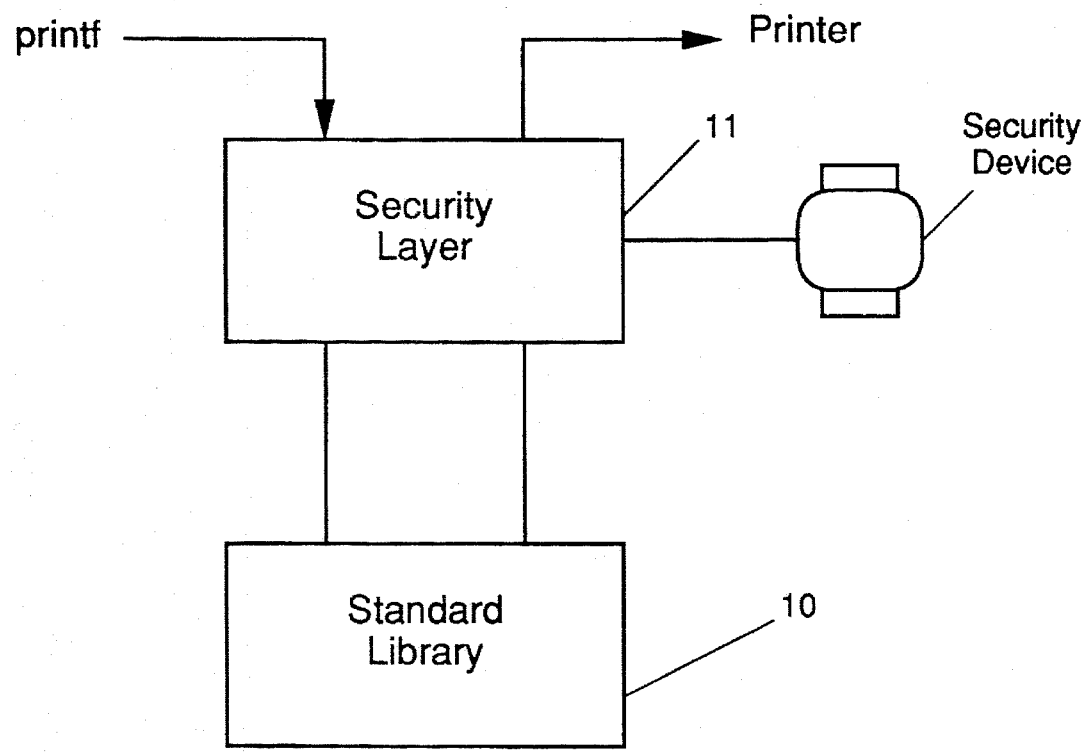
FIG. 2 is a block diagram of the present invention in which standard library calls are first routed through a security layer.

In accordance with the present invention, as exemplified in FIG. 2 a security layer 11 is interposed between the standard library files 10 and the developer's source code. In such a case, all standard library calls are in effect automatically rerouted through the security system prior to the placement to the standard library 10. All that is required on the part of the developer is the inclusion of a security header and file which is part of the security layer at the beginning of the source code used with the standard library 10. No modification of the original developer's source code associated with the standard library 10 is required.

The purpose of the security layer 11 is to provide protection of a particular software package from unauthorized use. One such security layer 11 might comprise a cryptological algorithm implemented with a combination of software and hardware. An example of such a system is disclosed in U.S. Pat. No. 5,222,133 marketed by Software Security, Inc. of Stamford, Conn.

For example, a hardware security device which may be installed in the computer or plugged into a computer part contains a unique and unalterable number referred to as a first key. A second key is installed in memory at the time of sale of the software package whose library also contains an algorithm which combines the two keys to create a third key used to unlock the software. The security layer 11 shown in FIG. 2 in block form activates the algorithm in the software, retrieves the first and second keys and unlocks the software by creating the third key. If the hardware device is not present or the third key is incorrect, a security violation occurs preventing the program to proceed.

An another example of a simpler security layer 11 is based on using a hardware device produced by Software Security of Stamford, Connecticut which contains a plurality of numbers. The library of the software to be protected also contains the same plurality of numbers. During execution of the protected software package, the security layer 11 activates special routines which send particular numbers to the hardware device which returns an acknowledge signal if the numbers match. If no acknowledge signal is provided, a security violation results which stops the protected program.

With the security layer 11 interposed as shown in FIG. 2, all that is required on the part of the developer is to provide a security header and library file to implement security. Merely as an example, one such implementation using ANSI C standard functions could be as follows:

A. Developer's source code should contain a line:
   #include <security_header.h>

B. "security_header.h" file fragment:
   #ifdef SECURITY_ON
   #ifdef USES_SECURED_GETS
   #define gets(a) SECURED_GETS (password, a)
   char * SECURED_GETS (long password, char * a);
   #endif
   #endif C. What this does is during compiling, a test is made to see if SECURITY_ON has been previously defined and protection for function gets () is allowed (USES_

SECURED_GETS was defined). If so, then the standard ANSI C function gets (a) is replaced automatically by the compiler with the special security function SECURED_GETS (password, a). The function SECURED_GETS () has the following form:

```
//      Security library function example
        char * SECURED_GETS (long password, char * s)
{
        SECURITY_START ( );
        count++;
        if (count == HOW_OFTEN_TO_CHECK)
            SECURITY_CHECK_RESULT =
            CHECK_SECURITY_DEVICE ( );
            COUNT = 0
        if (SECURITY_CHECK_RESULT == OK)
            gets (s);
        else
            SECURITY_ERROR_HANDLER ( );
        SECURITY_END ( )
}
```

D. This macro can be repeated for any standard library function call which is secured, thus allowing developer selection of the scope and frequency of security checking.

An example for a Security_Header H file and a Security Library Fragment are as follows:

```
SECURITY_HEADER.H file example
#ifdef Uses_strlen_ssi
#define strlen strlen_ssi
size_t strlen_ssi (const char * str);
#endif
#ifdef Uses_strcpy_ssi
#define strcpy(a,b) strcpy_ssi(510, (void *)0, b+5, a−10)
char * strcpy_ssi (int conv_type, void * dummy, char *
src, char * dest);
#endif
SECURITY LIBRARY FRAGMENT EXAMPLE
#include <string.h>
#include <stdio.h>
size_t   strlen_ssi(const char * str)
{
        puts("SSI Function works - STRLEN_SSI");
        if (SECURITY_CHECK( ) == OK)
            return strlen (str);
        else
            return ERROR;
}  /* strlen_ssi */
char * strcpy_ssi(int conv_type, void * dummy, char *
src, char * dest)
{
        puts ("SSI Function works - STRCPY_SSI");
        if (conv_type == ssiCONV5_10)
        (
          src −= 5;
          dest += 10;
        ) /* if */
        if (SECURITY_CHECK( ) == OK)
            return strcpy (dest, src);
        else
            return ERROR
)  /* strcpy_ssi */
```

In using the above example, the developer's source code would include:
define Uses_strlen_ssi
define Uses_strcpy_ssi
include "security_header.h"

The ssi represents the Software Security, Inc. security layers which have been referred to above.

Accordingly, a method is provided in which a developer can incorporate a security system with little or no knowledge of security systems. This may be implemented without altering the original source code or C-libraries used.

The security system can perform security functions on a random, periodic or other basis, such as:
1. Check for the presence of a security hardware device.
2. Encrypt/Decrypt data.
3. Read/Write parameters from security device memory.
4. Perform calculations.

When a security function is exercised, if a violation has occurred, e.g., removal, non-presence, or use of improper hardware security device, a security alarm will result and the software operation will be automatically halted.

The developer can create the application and test it without any thought given to security. When it is desired to incorporate security functions, this can be accomplished by a single directive to turn security on and requires no special knowledge on the part of the developer. The developer simply incorporates a security system already developed by experts in the security field. The developer can control the frequency of security checking. Again, it should be noted no modification of the original developer's source code is required except for a single statement for the inclusion of the security header file at the beginning of the source code. This security header can be included at the beginning of the development cycle because security can be turned on or off with an external compiler directive.

Since other modifications and changes varied to fit particular operating requirements and environments will be apparent to those skilled in the art, the invention is not considered limited to the examples chosen for purposes of disclosure and covers all modifications and changes which do not constitute departures from the true spirit and scope of the invention.

I claim:

1. A method of protecting a developer's software without requiring a source code modification on the part of the developer comprising the steps of:

interposing by the developer a security layer furnished by another in front of standard library files being utilized for writing a software program, which security layer incorporates a header, said header including a statement which is placed as the first statement of said software program, creating a path to a standard library file through a security file which is the security function in library form already compiled into said software program to implement security for said software program each time a call is made to said standard library file, whereby said security layer automatically reroutes standard library calls through said security layer to the standard library file.

2. The method according to claim 1, wherein said security header file includes function definitions the same as a definition of said standard library file definitions, wherein calls to said standard library file result in a security function being performed, and following said security function, said standard library functions are called.

3. A method of protecting a developer's software which includes a plurality of standard library files, without requiring a source code modification, comprising:

interposing a security header file in said developer's software, said header file defining a path for each call to one of said standard library files;

interposing a security file in each path which provides a security function in a library of said software, said security function controlling operation of said software program by verifying authorization of said program execution; and passing control to said library files following verification of said authorization.

4. The method of claim 3, wherein a header statement is placed in said software which identifies said security header file.

5. The method of claim 3, wherein said security file identifies and creates two instructions for each call to said one library file, the first to perform said authorization verification and subsequently invokes said one standard library file.

6. A method of protecting software that includes a plurality of standard library files, each standard library file including a plurality of standard library functions, the method comprising the steps of:

providing a security file including a library of security functions;

incorporating a statement referring to a header, the header including a reference to a security function included in the security file, the security function corresponding to a standard library function, into the software;

incorporating the header referred to by the statement into the software;

creating a path to a standard library function through the corresponding security function determined in tile header;

verifying, with the security function, authorization of program execution; and, passing control of execution of the software to the standard library function following verification of the authorization.

7. The method of claim 6, wherein the step of creating a path to a standard library function comprises the steps of:

providing a security function including an authorization, verification portion and a reference to a standard library function portion; and replacing references to standard library functions in the developer's software with references to corresponding security functions.

* * * * *